US006779064B2

(12) United States Patent
McGowen et al.

(10) Patent No.: US 6,779,064 B2
(45) Date of Patent: Aug. 17, 2004

(54) SYSTEM, METHOD, AND COMPUTER PROGRAM PRODUCT FOR ON-LINE REPLACEMENT OF A HOST BUS ADAPTER

(75) Inventors: Michael E. McGowen, Spring, TX (US); William C. Edwards, Spring, TX (US); Peter J. Brown, Houston, TX (US); Craig M. Belusar, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 416 days.

(21) Appl. No.: 10/057,404

(22) Filed: Jan. 24, 2002

(65) Prior Publication Data

US 2003/0140191 A1 Jul. 24, 2003

(51) Int. Cl.[7] .......................... G06F 13/00; G06F 15/16; G06F 9/00
(52) U.S. Cl. ...................... 710/104; 710/300; 710/301; 710/302; 710/303; 709/227; 709/228; 713/1; 713/2; 713/100
(58) Field of Search .................. 710/104, 300, 710/301, 302, 303, 304, 316; 713/1, 2, 100; 709/208, 209, 2

(56) References Cited

U.S. PATENT DOCUMENTS 5,485,460 A * 1/1996 Schrier et al. .............. 709/227
5,553,281 A * 9/1996 Brown et al. ............. 707/104.1
5,655,148 A * 8/1997 Richman et al. ............... 710/8

* cited by examiner

Primary Examiner—Tim Vo

(57) ABSTRACT

A system and method for enabling multi-path functionality between a host bus adapter (HBA) in a host computer of a storage system and at least one storage device is disclosed. The host computer includes a processor and associated memory, and an operating system including a PnP manager that maintains a logical device stack for the storage device. An HBA-specific filter driver intercepts responses from the underlying HBA driver to specified PnP requests. These responses are modified to prevent standard Microsoft operating system SCSI class device drivers from being loaded for devices attached to the HBA. Instead, the modified responses cause a multi-path SCSI class device driver to be loaded. The filter driver also monitors the status of the paths to a device and, upon request, provides status information to the multi-path SCSI class device driver. The multi-path SCSI class driver may use this status information to decide whether to make a particular path a primary path. The actions required to make a path a primary path may be performed by the filter driver, e.g., through a function call to the filter driver initiated by the multi-path SCSI driver.

9 Claims, 13 Drawing Sheets

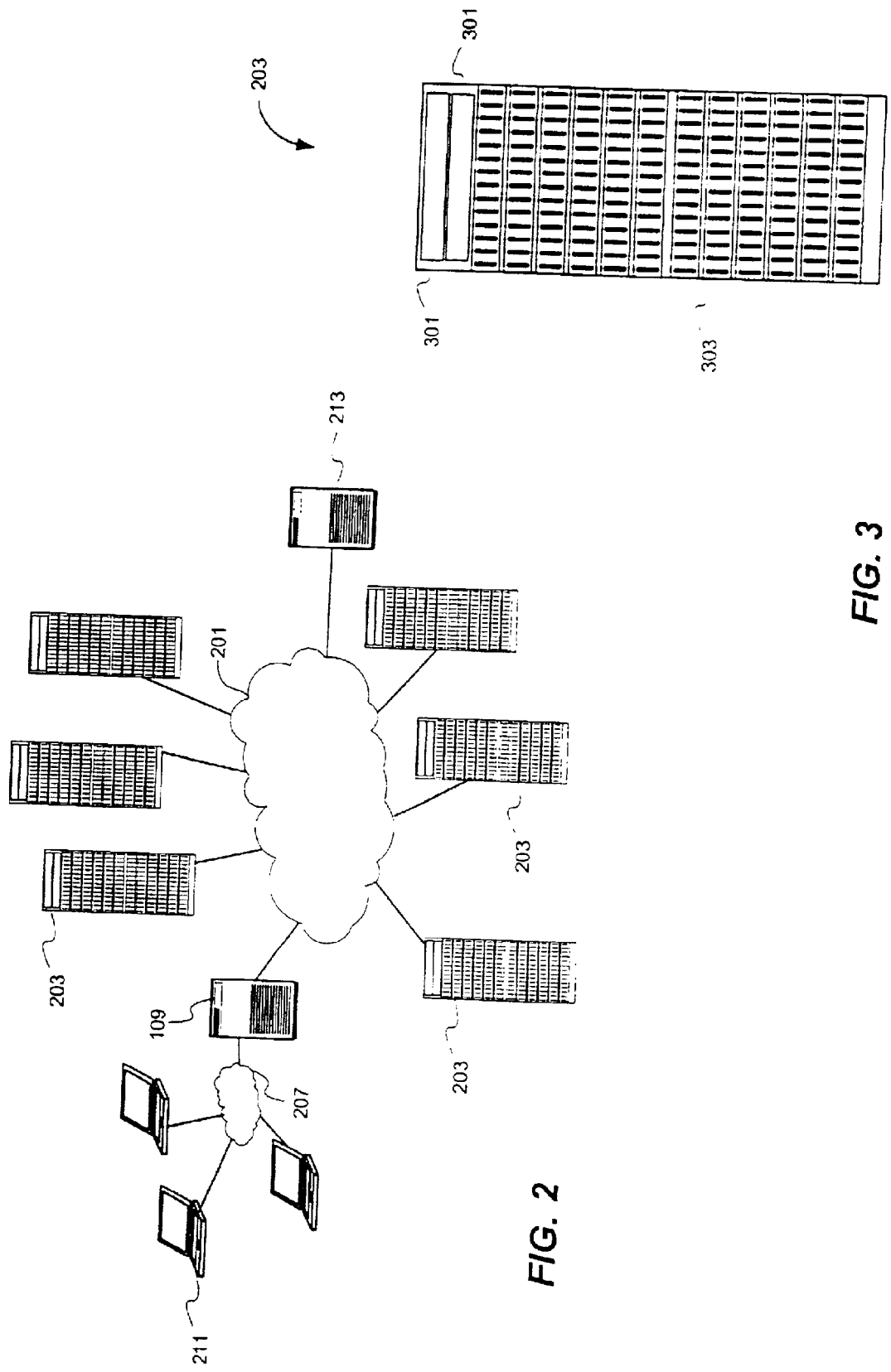

SYSTEM, METHOD, AND COMPUTER PROGRAM PRODUCT FOR ON-LINE REPLACEMENT OF A HOST BUS ADAPTER

BACKGROUND OF THE INVENTION

1. Field of the Invention

The present invention relates to computer-based information storage systems. More particularly, the present invention relates to systems and methods for permitting a failed host bus adapter (HBA) to be repaired and replaced online, i.e., without having to shut down the host computer in which the HBA resides.

2. Background of the Invention

The increased importance of information technology in business processes has fostered increased demands for data storage systems that combine the features of high storage capacity, high reliability, efficient scalability, and cost-effectiveness. Early computer systems relied heavily on direct-attached storage (DAS) systems consisting of one or more disk drives coupled to a system bus. DAS systems were not well adapted to satisfy these demands. More recently, storage area network (SAN) technologies have been implemented. SAN architectures permit organizations to uncouple application servers from data servers to provide storage systems with greater capacity, higher reliability, and higher availability.

In operation, users access a storage system through a file system implemented in a storage system computer, typically referred to as a host computer. The term file system refers to the logical structures and software routines, usually closely tied to the operating system software, that are used to control access to storage in the system. A host computer receives requests from external devices for information stored in the storage system, processes the requests, retrieves the desired information from the storage devices, and transmits the information to the external devices. Many SANs implement a high-speed connection, e.g., a Fibre Channel (FC) connection, between the host computer and the storage devices. This connection is enabled by a Host Bus Adapter (HBA), which provides a communication connection between the host bus (typically a PCI bus) and the FC connection.

SAN systems implement redundancy to enhance the reliability of the system. For example, RAID (Redundant Arrays of Inexpensive Disks) techniques are used to enhance data storage reliability. In addition, in many SAN systems data storage devices (e.g., disk drives) are connected to redundant disk controllers by at least one high-speed data communication link, e.g., a Fibre Channel Arbitrated Loop (FCAL), to provide a network of interconnected storage devices. Further, SAN systems may implement redundant components such as power supplies, cooling modules, disk devices, temperature sensors, audible and/or visible alarms, and RAID and other controllers to increase system reliability. If a component fails, then the redundant component assumes the functions of the failed component so the storage system can continue operating while the failed component is repaired or replaced.

Host computers may include two or more HBAs for providing redundant connections between a host computer and storage devices in the SAN. If one of the HBAs fails, then the host computer's operating system redirects communications with the storage devices through an active HBA. The failed HBA may then be replaced or repaired. SANs are often implemented in computing environments that must meet stringent availability requirements. To meet these requirements, it is desirable to keep host computers operating continuously. Accordingly, it is desirable to provide systems and methods for enabling replacement of failed HBAs while the host computer remains on-line, i.e., operational.

SUMMARY OF THE INVENTION

The present invention addresses these and other problems by providing a storage system architecture and operating method that permits a failed host bus adapter (HBA) to be repaired and/or replaced online, i.e., without shutting down the host computer system. The present invention may be implemented in a host computer that uses a Plug-and-Play capable operating system, such as the Microsoft Windows® brand operating system, that supports the Windows Driver Model (WDM) architecture.

In one aspect, the present invention uses one or more host bus adapter (HBA) specific filter drivers and a storage device SCSI class driver to provide multi-path functionality. The filter driver intercepts responses to Plug-and-Play requests from the underlying HBA driver. These responses are modified to prevent standard Microsoft operating system SCSI class device drivers from being loaded for devices attached to the HBA. Instead, the modified responses cause a multi-path SCSI class device driver to be loaded. The filter driver also monitors the status of the paths to a device and, upon request, provides status information to the multi-path SCSI class device driver. The multi-path SCSI class driver may use this status information to decide whether to make a particular path a primary path. The actions required to make a path a primary path may be performed by the filter driver, e.g., through a function call to the filter driver initiated by the multi-path SCSI driver.

The software architecture of the multi-path SCSI class driver permits the replacement of a failed redundant HBA. In addition, the multi-path SCSI class driver serves several purposes. First, it provides the storage device specific functionality required by the operating system, i.e., functionality equivalent to the corresponding Microsoft SCSI class device driver. These device specific driver requirements and interfaces are well documented in the Microsoft Windows Device Driver Development Kit (DDK). Second, the multi-path SCSI class driver implements two layers of device objects to enable multi-path functionality. The upper layer consists of a single "master" device object for each device. Beneath the master device object, at the lower layer, a "component" device object is created for each path that exists to a device. One or more component device objects are linked to a master device object. The master device object acts as a switch to route I/O to the component device object that represents an active or available path. The master device object contains logic to re-reroute I/O to one of the redundant paths in the event of a failure.

The master device object is not placed in the PnP device stack of an HBA. This allows the device stack associated with any path to be removed from the component device object down, while maintaining a persistently present device (i.e., the master device object) to upper levels of the operating system.

BRIEF DESCRIPTION OF THE DRAWINGS

FIG. 2 is a schematic depiction of an alternate embodiment of a storage system in accordance with the present invention;

FIG. 3 is a schematic depiction illustrating a storage cell shown in FIG. 2 in greater detail;

DETAILED DESCRIPTION

The present invention is illustrated and described in terms of a distributed computing environment such as an enterprise computing system using a private SAN. However, the particular storage system configuration is not critical to the present invention.

In the exemplary storage systems described herein, computing systems that access storage are referred to as hosts or host computers. In a typical implementation, a host is any computing system that manages data storage capacity on its own behalf, or on behalf of systems coupled to the host. For example, a host may be a supercomputer processing large databases, a transaction processing server maintaining transaction records, and the like. Alternatively, a host may be a file server on a local area network (LAN) or wide area network (WAN) that provides mass storage services for an enterprise. In direct attached storage systems, a host would be outfitted with one or more disk controllers or RAID controllers that would be configured to manage multiple directly attached disk drives. By contrast, a host connects to a SAN over a high-speed connection, such as a fibre channel (FC) fabric.

The present invention may be implemented in a SAN architecture comprising one or more storage cells, wherein each storage cell comprises a pool of storage devices referred to as a disk group, or a reporting group. Each reporting group comprises redundant storage controllers coupled to the disk group. The storage controllers may be coupled to the storage devices using an FCAL connection, or through a network such as a FC fabric or the like. The storage controllers are also communicatively coupled through a point-to-point connection such as, for example, a PCI bus or a SCSI bus.

Figure 1:
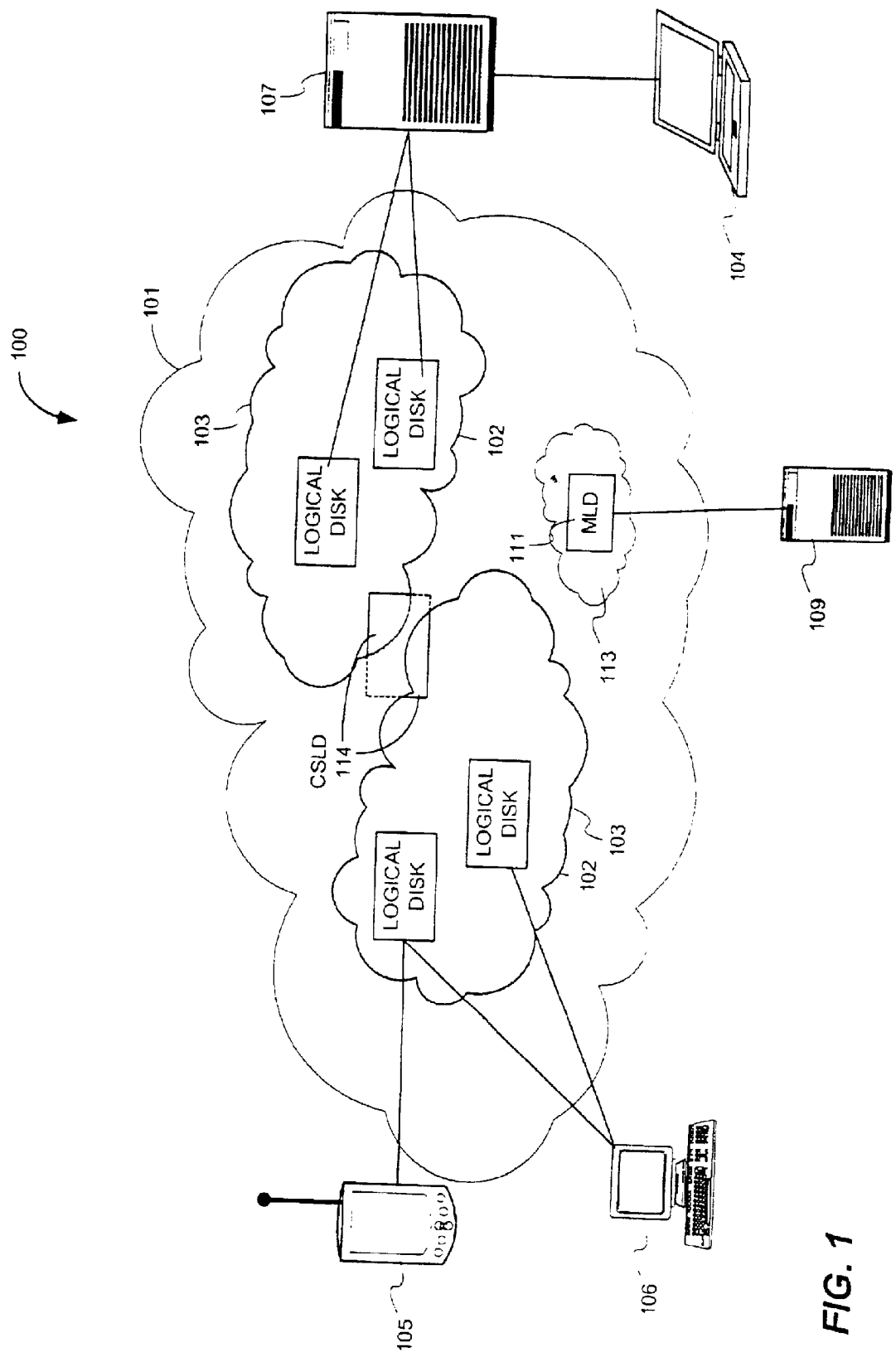
FIG. 1 is a schematic depiction of an exemplary storage system in accordance with the present invention.

FIG. 1 is a schematic depiction of an exemplary SAN environment 100 in which the present invention may be implemented. Environment 100 shows a storage pool 101 comprising an arbitrarily large quantity of storage space from which logical disks (also called logical units or LUNs) 102 may be allocated. In practice, storage pool 101 will have some finite boundaries determined by a particular hardware implementation, however, there are few theoretical limits to the size of a storage pool 101.

In an exemplary embodiment, storage capacity in storage pool 101 is virtualized. Logical device allocation domains (LDADs) 103, which correspond to a set of physical storage devices from which LUNs 102 may be allocated, are defined. LUNs 102 do not span LDADs 103 in the preferred implementations. Any number of LDADs 103 may be defined for a particular implementation as the LDADs 103 operate substantially independently from each other. LUNs 102 have a unique identification within each LDAD 103 that is assigned upon creation of a LUN 102. Each LUN 102 is essentially a contiguous range of logical addresses that can be addressed by host devices 105, 106, 107 and 109 by mapping requests from the connection protocol used by the hosts to the uniquely identified LUN 102.

Host computer 107 may function as a storage server, through which client 104 may access LUNs 102. Server 107 may provide file services to network-connected clients, transaction processing services for a bank automated teller network, telephone call processing services and the like. Hence, client devices 104 may or may not directly use the storage consumed by host 107. It is also contemplated that devices such as computer 106 and wireless device 105, which are also hosts, may logically couple directly to LUNs 102. Hosts 105–107 may couple to multiple LUNs 102, and LUNs 102 may be shared amongst multiple hosts, although in a particular implementation each LUN 102 is presented to a specific host 105–107.

FIG. 2 is a schematic depiction of an alternate embodiment of a storage system in accordance with the present invention. Network 201, such as a fibre channel fabric, interconnects a plurality of storage cells 203. Storage cells 203 are accessible through fabric 201, or by management appliance 109 through LANs/WANs 207. Storage cells 203 implement a storage pool 101. The principal limitation to the number of storage cells that can be included in any SAN is the connectivity implemented by fabric 201. A fabric comprising even a single fibre channel switch can interconnect 256 or more ports, providing a possibility of hundreds of storage cells 203 in a single storage pool 101.

Host computer 213 includes at least one host bus adapter (HBA), which includes hardware and software for providing a communication connection between the host computer's processor (or processor bus) and fabric 201. An HBA may be implemented as a plug-in card on a host computer system. The communication connection to fabric 201 may be through an optical coupling, e.g., a PCI-to-FC bus adapter, or more conventional conductive cabling depending on the bandwidth requirements. Exemplary HBAs include the StorageWorks PCI-to-Fibre Channel Host Bus Adapters available from Compaq Computer Corporation, Houston, Tex., USA.

As shown in FIG. 3, each storage cell 203 in the preferred embodiment comprises a pair of network storage controllers (NSCs) 301 coupled by a fibre channel arbitrated loop (FCAL) to a plurality of hard disks located in disk cabinet 303. NSC 301 implements a network interface to receive storage access requests from hosts as well as FCAL ports to connect to storage device in cabinet 303. NSCs 301 may be communicatively coupled by a high-speed connection such as a FC point-to-point connection. While the particular embodiments are illustrated with FC communication links, any communication protocol and hardware that provides sufficient bandwidth for a particular application may be used, including proprietary hardware and protocols.

Figure 4:
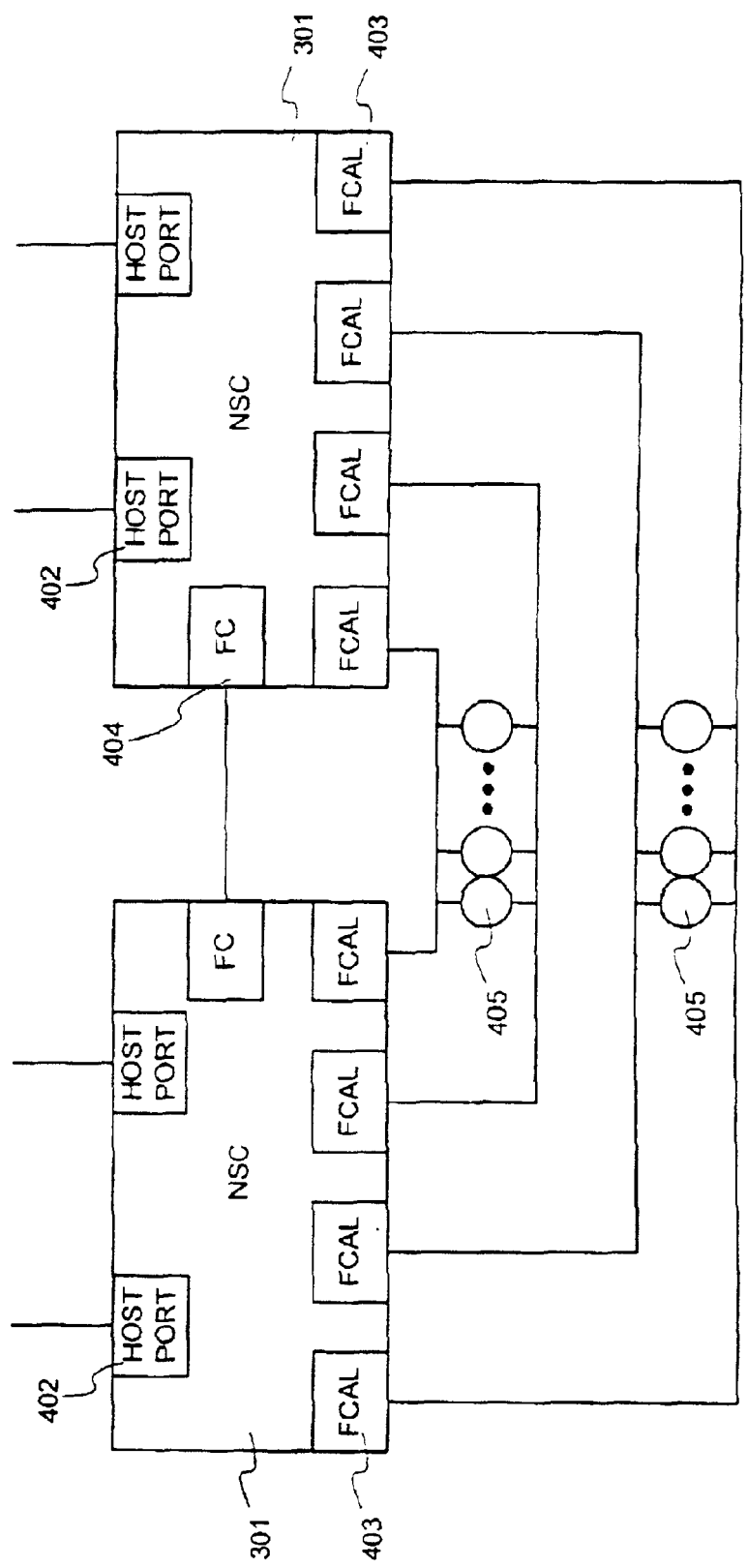
FIG. 4 is a schematic depiction of an alternate embodiment storage cell.

FIG. 4 is a schematic depiction of an exemplary storage cell 203. Referring to FIG. 4, storage cell 203 includes redundant NSCs 301 and a plurality of storage devices 405 connected to the NSCs by redundant FCAL communication links. NSCs 301 may be embodied as a printed circuit board including one or more microprocessors and associated memory. The processor executes logic, including firmware stored in ROM, for managing communication with storage devices 405. In an exemplary embodiment, each NSC 301 includes redundant copies of firmware. The redundant copies may be referred to as image A, stored in an active ROM segment, and image B, stored in a redundant ROM segment.

NSCs 301 also include a plurality of communication ports 402, 403 and 404. Host adapter ports 402 provide a communication interface to fabric 201 (shown in FIG. 2) and may be implemented as FC N_Ports. Each host adapter port manages communication with fabric 201, and is assigned a fabric-unique port ID in the login process. Dual host port connections on each NSC 301 provide redundancy.

Each NSC 301 includes a plurality of communication ports 403 for communicating with storage devices 405. In an exemplary embodiment, the communication ports 403 may be FCAL ports. Any number of FCAL ports 403 may be implemented in each NSC 301. In the exemplary embodiment depicted in FIG. 4, each NSC 301 includes four FCAL ports 403. FCAL ports 403 are provide communication connections to drives 405. It will be appreciated that a variety of configurations are possible. For example, rather than an FCAL configuration, a fibre channel fabric using a switch could be used to couple to drives 405. The particular FCAL implementation shown allows up to 120 drives in each of two FCAL loops (240 drives per storage cell 203), where each loop is accessible by either NSC 301 to provide redundant connectivity.

As described above, it is desirable for a host computer to include redundant HBAs to increase the reliability of the storage system. If one of the HBAs fails, it is desirable to provide the ability to replace the HBA on-line, i.e., in a manner that does not require re-booting the host computer. In one aspect, the present invention implements a software architecture and associated functionality for permitting on-line replacement of a failed HBA that may be implemented in computer systems that utilize Plug-and-Play capable operating systems, such as the Microsoft Windows® brand operating system, that supports the Windows Driver Model (WDM) architecture. Device specific requirements and interface requirements are well documented in the Microsoft Windows® Device Driver Development Kit (DDK). Additional information is available at www.microsoft.com.

This software architecture and functionality are set forth in flowcharts in FIGS. 5–14. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

In operation, when a supported HBA is found by the host computer operating system's PnP manager, an HBA-specific filter driver is loaded as an upper filter to the HBA's function driver. The HBA-specific filter driver's AddDevice driver entry point is called, which creates an HBA-specific filter device object and attaches it to the device stack of the HBA. This allows the HBA-specific filter driver to monitor subsequent PnP requests to the HBA, and responses thereto. The HBA-specific filter driver intercepts responses to IRP_QUERY_DEVICE_RELATIONS having a minor function code of BusRelations. The HBA-specific filter driver obtains a list of physical device objects (PDO's) from the responses and creates a storage device filter device object for each PDO.

Figure 5:
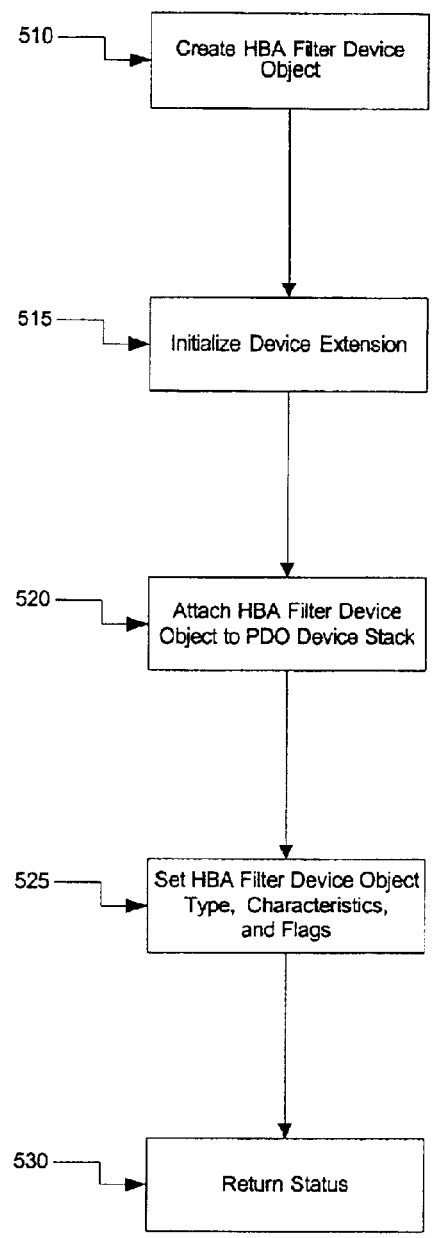
FIG. 5 is a flowchart illustrating the Add Device routine implemented by the HBA-specific filter driver.

FIG. 5 is a flowchart illustrating the Add Device routine implemented by the HBA-specific filter driver when an HBA is located by the operating system's PnP manager. Referring to FIG. 5, at step 510 an HBA Filter Device Object is created, and at step 515 a device extension for the HBA Filter Device Object is initialized. At step 520, the HBA Filter Device Object is attached to the device stack of the physical device object (PDO), e.g., by using the kernel API IoAttachDeviceToDeviceStack. It will be noted that the filter driver is loaded as an upper filter to the HBA's function driver. Therefore, for each HBA found that is supported by the underlying HBA function driver, the filter driver's AddDevice routine will be called. One of the input arguments to the AddDevice routine is a pointer to the underlying PDO, and it is to the device stack of this PDO that the filter driver attaches. For example, if there are four supported HBA's, then there will be four calls to the filter driver's AddDevice routine, each with a different PDO pointer.

At step 525 the new device object type, characteristics, and flags are set, preferably to the same values as those of the HBA PDO. At step 530, control is returned to the calling routine. Status information indicating whether the AddDevice routine was successful is passed back to the calling routine.

Figure 6:
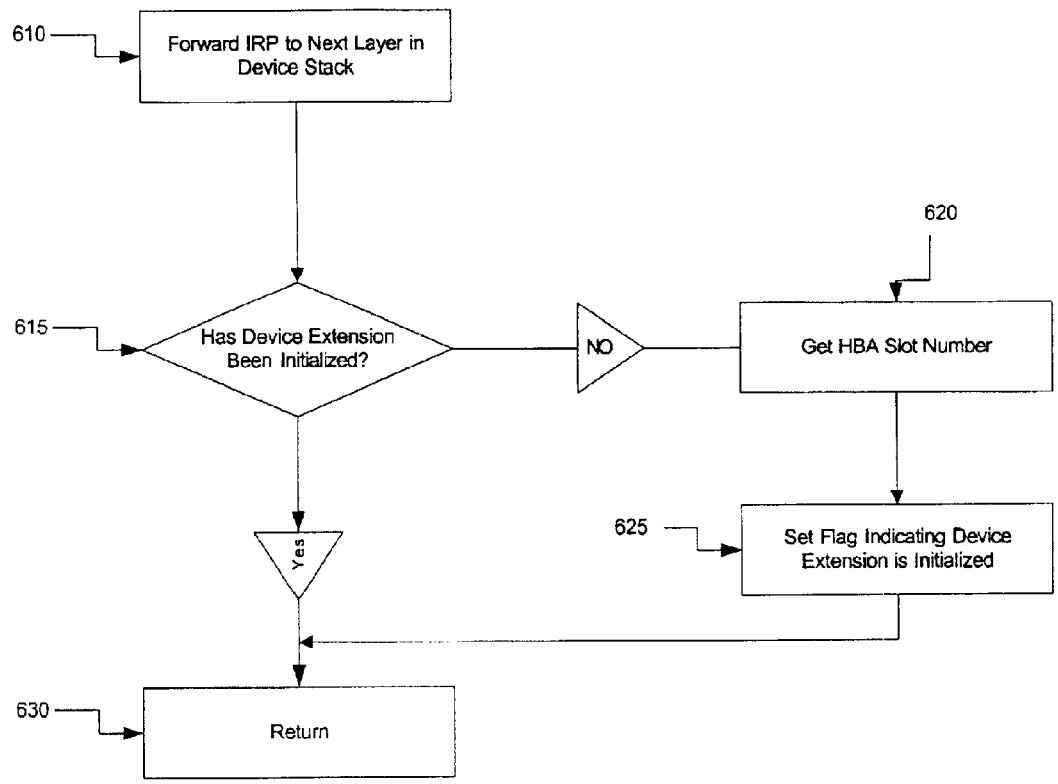
FIG. 6 is a flowchart illustrating the initialization process undertaken by the HBA Filter Device Object.

After the HBA Filter Device Object is created and added to the PDO device stack, the operating system's PnP manager will initiate a start sequence for the HBA's device stack, e.g., by sending an IRP_MN_START_DEVICE to the top of the HBA device stack. FIG. 6 is a flowchart illustrating the initialization process undertaken by the HBA Filter Device Object in response to the IRP_MN_START_DEVICE from the PnP manager. At step 610, the IRP_MN_START_DEVICE is forwarded to the next layer in the device stack, which performs its operation(s) for starting the device and forwards the IRP down through the stack. The bottom layer of the stack performs whatever steps are necessary to start the device, and when it is finished the IRP is passed back up the stack. Each layer in the stack may perform operations in response to the START_DEVICE request. This results in the processing effectively being done from the bottom of the stack to the top. The Windows DDK has a clear explanation of this sequence.

At step 615, the HBA-specific filter driver determines whether the HBA Filter device object has been initialized by examining a driver-maintained flag in the device extension. A device may be started and stopped several times while the driver is loaded. However, certain initialization steps need only be performed the first time the device is started. The first time the device is started, this flag will be set to FALSE. The initialization steps will be performed and the flag set to TRUE. Thus, when subsequent START requests are received for the device, those initialization steps will be skipped. If the device has not been initialized, then the HBA slot number is retrieved (step 620) and a flag is set indicating that the HBA Filter Device Object has been initialized (step 625). At step 630, the HBA Filter Device Object initialization routine terminates.

Figure 7:
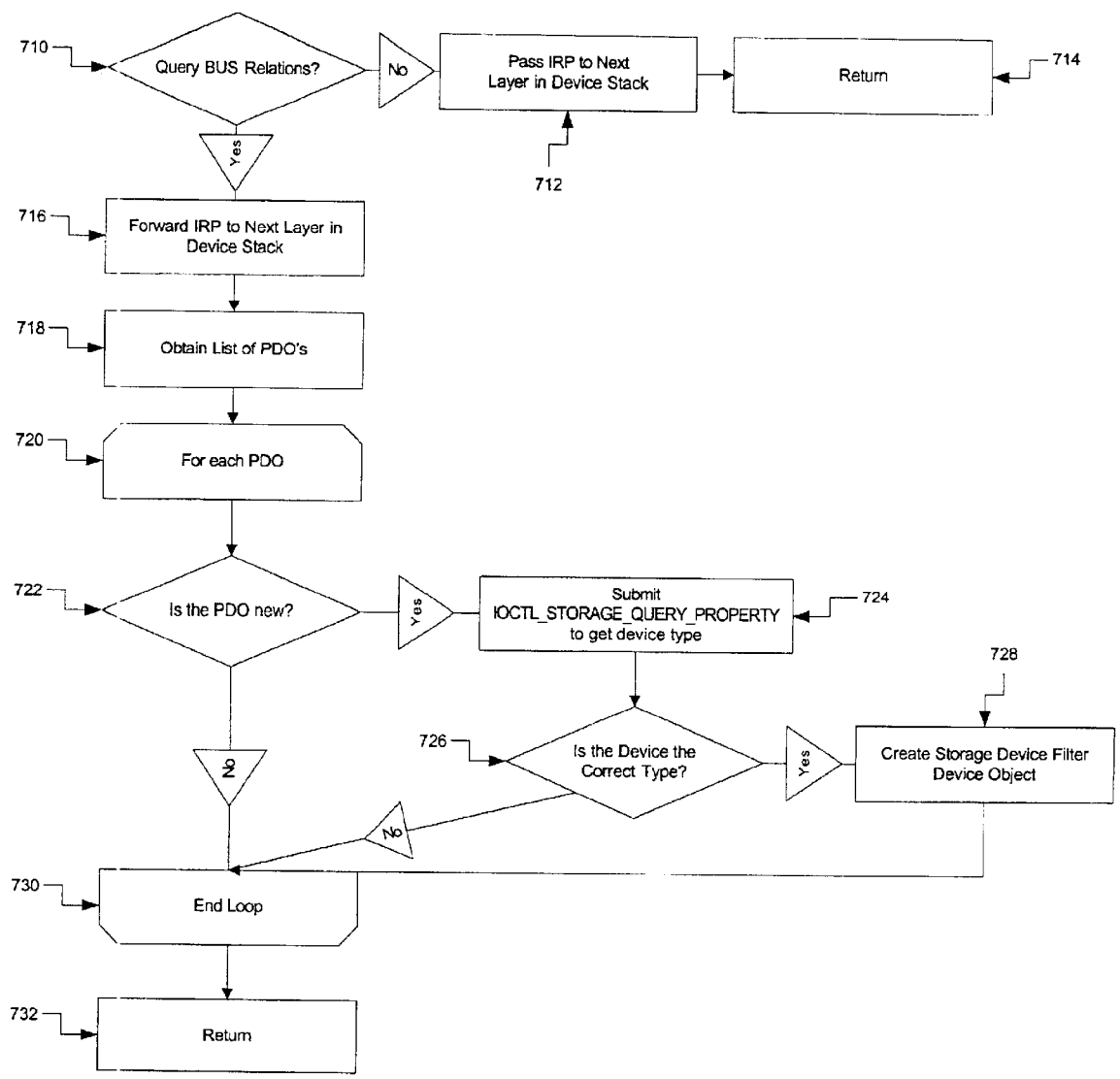
FIG. 7 is a flowchart illustrating a logic routine executed by the HBA-specific filter driver in response to an IRP_MN_QUERY_DEVICE_RELATIONS request.

The HBA-specific filter driver monitors communication between the PnP manager and the HBA function driver, and includes logic that looks for a response to a PnP I/O request packet (IRP) that has a minor function code of IRP_MN_QUERY_DEVICE_RELATIONS and a BusRelations query device relations type. FIG. 7 is a flowchart illustrating a logic routine executed by the HBA-specific filter driver in response to an IRP_MN_QUERY_DEVICE_RELATIONS request. At step 710, it is determined whether the function code is BusRelations. If not, then the logic routine passes the IRP to the next layer in the device stack (step 712) and the routine is terminated (step 714). If the minor function code is BusRelations, then at step 716 the HBA-specific filter driver forwards the IRP to the next layer in the device stack (i.e., the HBA function driver), which enumerates (or discovers) the physical storage devices attached to the HBA. The response to this IRP includes a list of pointers to PDOs representing the SCSI devices accessible by the HBA. The HBA-specific filter driver monitors the response, and obtains a list of the PDOs accessible by the HBA (step 718). At step 720, the logic routine enters a loop which tests to determine whether a PDO is new (step 722), and for each new PDO in the returned list of PDOs, the HBA-specific filter driver submits an IOCTL_STORAGE_QUERY_PROPERTY device I/O control call to the PDO (step 724). The reply from the PDO includes a (STORAGE_DEVICE_DESCRIPTOR) data structure that contains a data field indicating the storage device type. At step 726 it is determined whether the device is the correct type, i.e., whether it is of a device type that the user wishes to enable for multi-path communication. For each device for which multi-path support is desired, the HBA-specific filter driver creates a storage device filter device object (step 728) and attaches it to the device stack for the storage device, e.g., by using the Windows® API IoAttachDeviceToDeviceStack. This allows the storage device filter driver to monitor subsequent PnP requests to each desired storage device. After all the PDOs have been queried, the logic routine exits the loop (step 730) and the routine is terminated (step 732).

Figure 8:
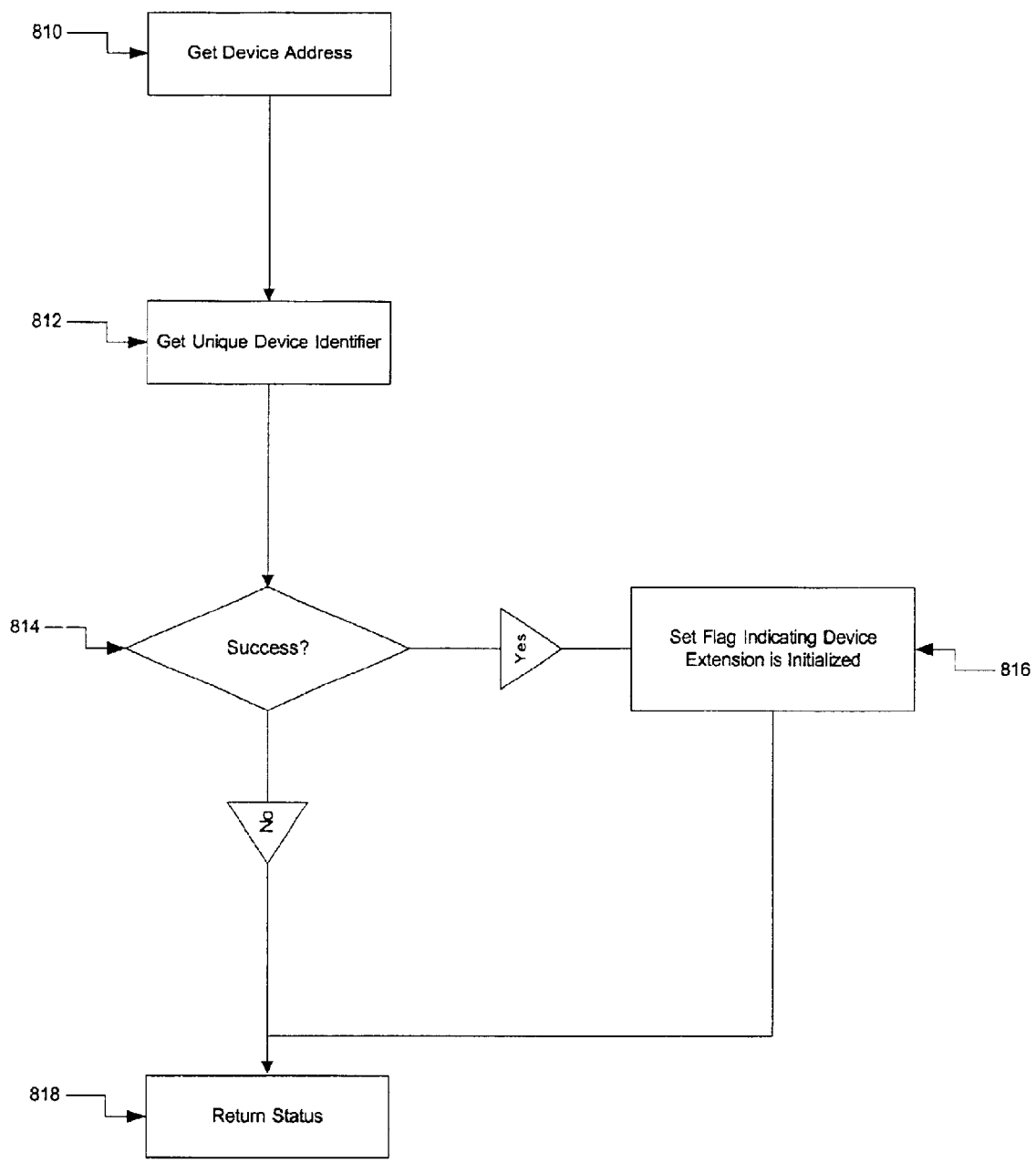
FIG. 8 is a flowchart illustrating the initialization process for a storage device filter device object.

FIG. 8 is a flowchart illustrating the initialization process for a storage device filter device object. In an optional implementation, at step 810 the storage device filter driver may get the device address. At step 812 the device identifier, which may be the device serial number, is retrieved from the storage device. The method of retrieving the identifier is storage device-dependent and may be a proprietary query routine, or standards based, such as using a SCSI command. If these data were retrieved successfully (step 814), then a flag is set indicating that the device extension has been initialized. The routine terminates at step 818.

Figure 9:
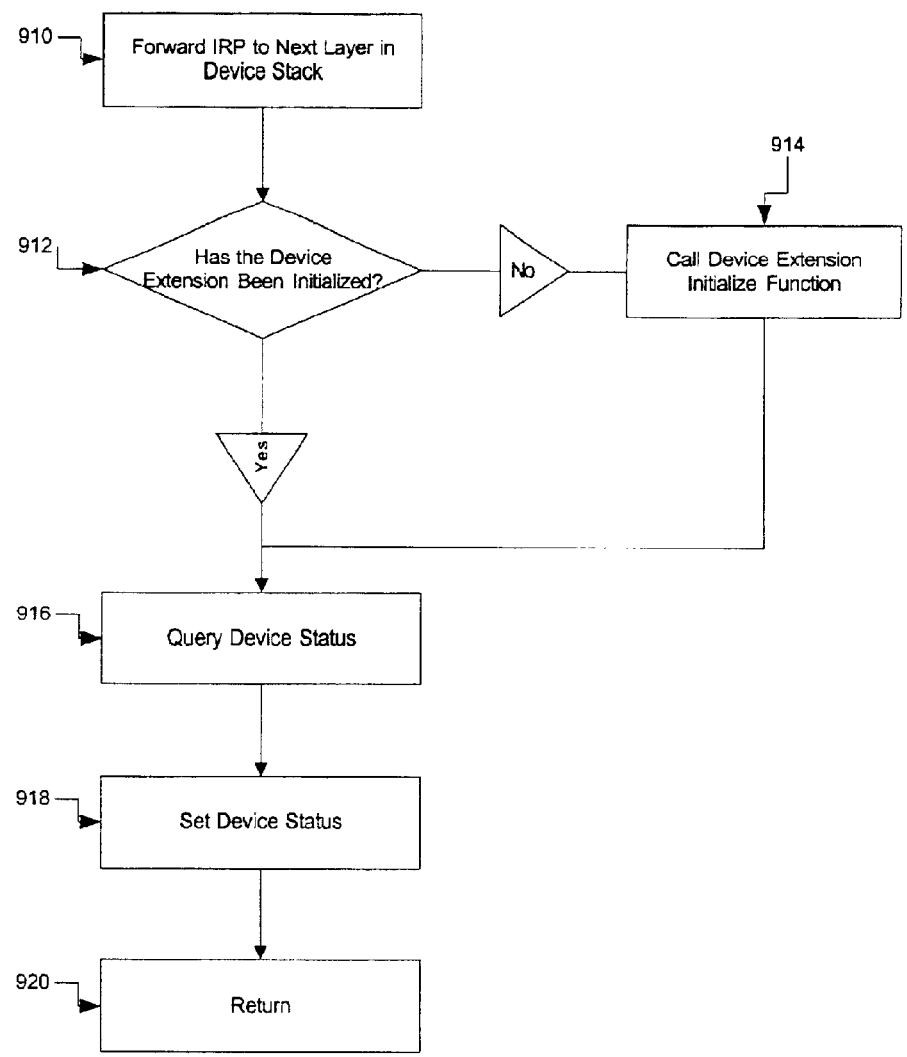
FIG. 9 is a flowchart illustrating a device start procedure executed by the storage device filter device object in response to an IRP_MN_START_DEVICE message.

FIG. 9 is a flowchart illustrating a device start procedure executed by the storage device filter device object in response to an IRP_MN_START_DEVICE message to the storage device's device stack from the operating system's PnP manager. At step 910, the IRP_MN_START_DEVICE message is forwarded to the next layer in the device stack. At step 916 it is determined whether the device has been initialized, as described in connection with FIG. 8, and if not then an initialization routine is called. At step 920 the device status is queried, and at step 922 the device status is set. The driver may use this information to return the path status when queried by the multi-path SCSI class driver. The routine terminates at step 924.

The HBA-specific filter driver monitors communication between the PnP manager and the storage device(s), looking for a response to a PnP IRP with a minor function code of IRP_MN_QUERY_ID. For BusQueryDeviceID, BusQueryCompatibleIDs, and BusQueryHardwareIDs query types, the HBA-specific filter driver scans the response data for the PnP enumerator type of "SCSI" and replaces "SCSI" with a selected enumerator type. The selected enumerator type may be, for example, "WXYZ" or another enumerator type. For BusQueryHardwareIDs query types, the filter driver also replaces the generic hardware ID string with a selected hardware ID string. For example, the generic hardware ID string for a disk is "GenDisk", which might be replaced with "XyzDisk".

These substitutions serve two purposes. First, they prevent the standard operating system device-specific class driver from being loaded. Second, they cause the multi-path device driver for the device to be loaded, provided the setup information file (INF) contains the same hardware identifiers as the modified identifiers created by the filter driver string substitutions. The PnP manager executes logic to match the hardware identifiers in the response(s) with those in the INF file.

Figure 10:
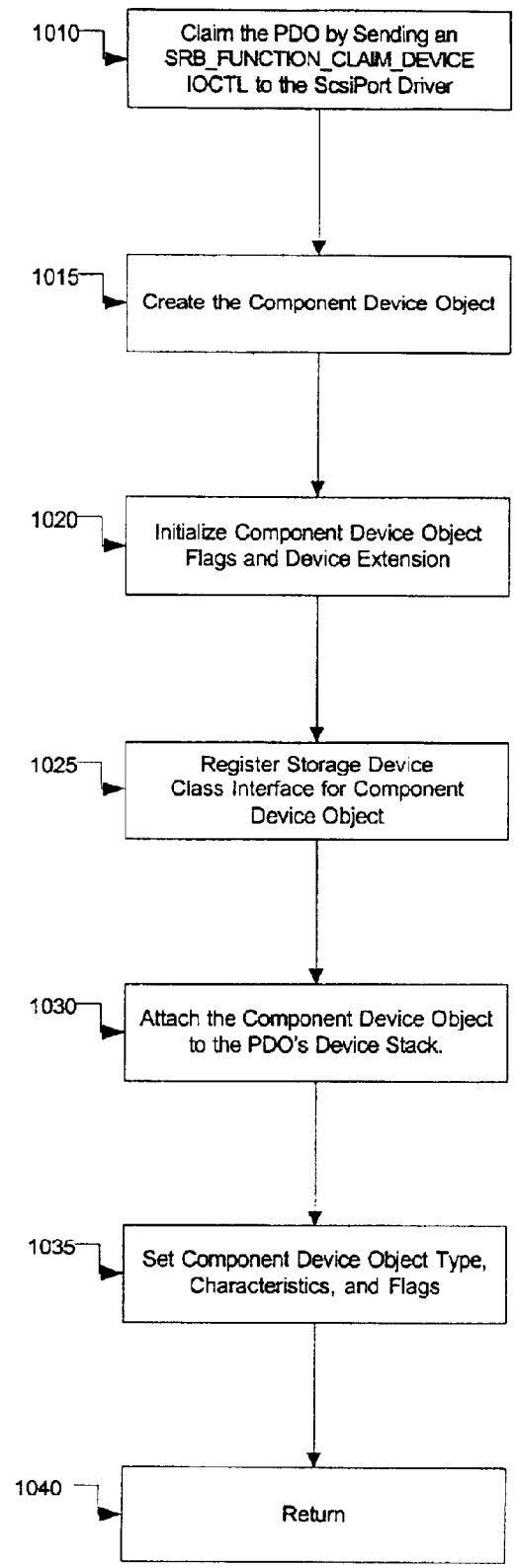
FIG. 10 is a flowchart illustrating the logic of the multipath SCSI class driver initialization Add Device routine.

Once the multi-path device class driver is loaded, its AddDevice driver entry point is called. FIG. 10 is a flowchart illustrating the logic of the multi-path SCSI class driver initialization AddDevice routine. At step 1010, the multi-path device driver claims the storage device by sending an SRB_FUNCTION_CLAIM_DEVICE IOCTL to the SCSIPort driver. At step 1015, the multi-path SCSI class driver creates a device object. From an OS and Windows Driver Model perspective, this device object is a functional device object (FDO) for the underlying storage device. From the perspective of the multi-path device class driver, the device object is referred to as a component device object. At step 1020, the multi-path SCSI class driver initializes the component device object's flags and device extension. At step 1025, the multi-path SCSI class driver registers the storage device class interface. At step 1030, the multi-path SCSI class driver attaches the component device object to the PDO's device stack, e.g., by using the Windows kernel API IoAttachDeviceToDeviceStack. At step 1035, the multi-path SCSI class driver sets the appropriate flags and status information for the component device object. At step 1040, the routine terminates.

The component device object is at or near the top of the PnP device stack for the underlying device associated with the HBA. Also, the component device object does not provide the full functionality of the underlying device. Instead, the functionality of the underlying device is provided by a master device object, which is discussed below. When the underlying device is started, the multi-path SCSI class driver queries the unique identifier of the device. The multi-path SCSI class driver then uses the unique identifier to determine whether to create a new master device object, or to add the component device object to the list of available paths for an existing master device.

Figure 11:
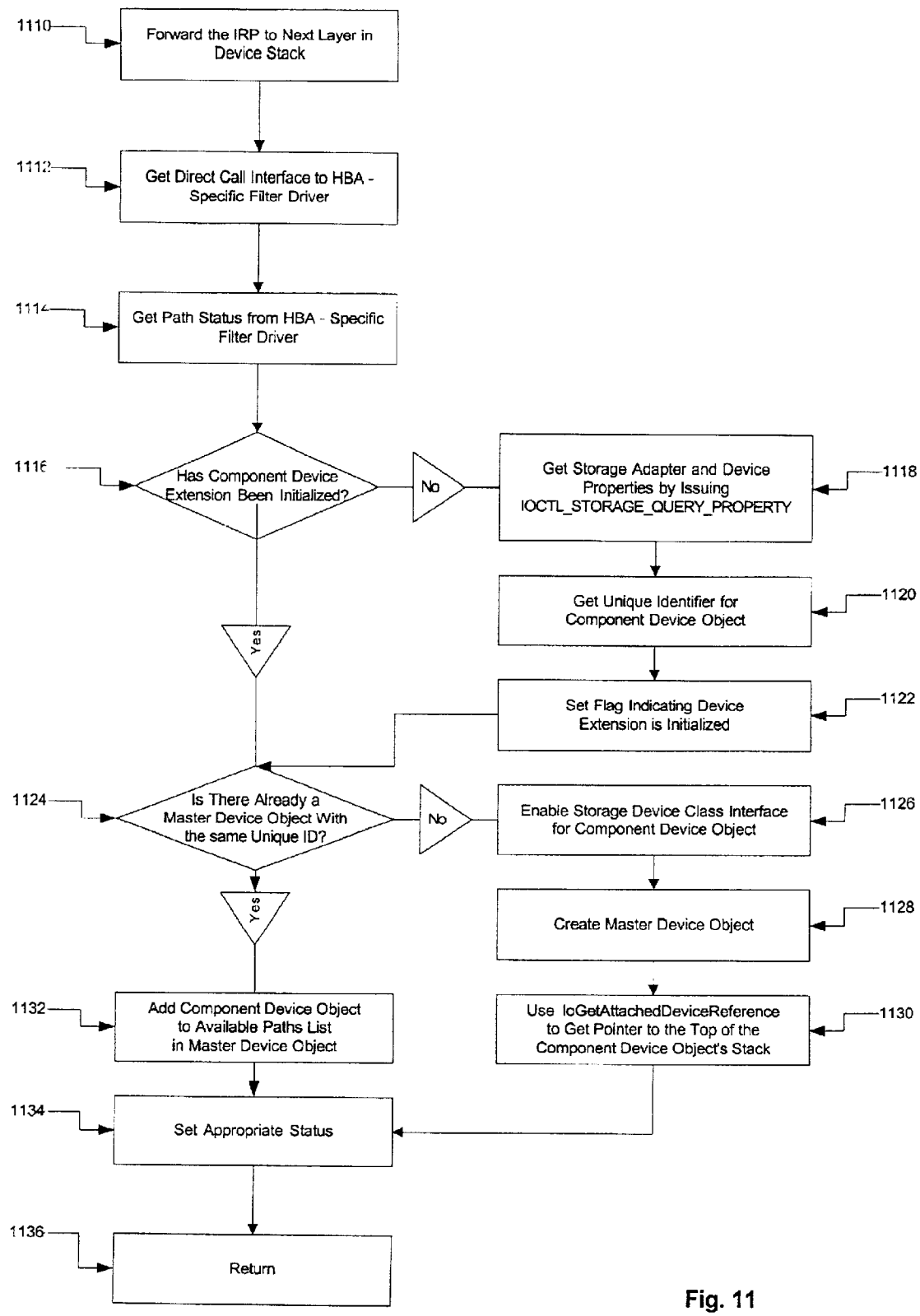
FIG. 11 is a flowchart illustrating the logic routines implemented by the SCSI class driver in response to an IRP_MN_START_DEVICE request.

An underlying device may be started by issuing an IRP_MN_START_DEVICE request. FIG. 11 is a flowchart illustrating the logic routines implemented by the multi-path SCSI class driver in response to an IRP_MN_START_DEVICE request. At step 1110, the multi-path SCSI class driver forwards the IRP to the next layer in the device stack. At step 1112, the multi-path SCSI class driver gets a direct call interface to the HBA-specific filter driver. At step 1114, the multi-path SCSI class driver gets the path status from the HBA-specific filter driver. At step 1116, the multi-path SCSI class driver determines whether the component device object has been initialized, e.g., by examining the driver flag described in connection with FIG. 8. If the component device object has not been initialized, then at step 1118 the multi-path SCSI class driver gets the storage adapter and device properties by issuing an IOCTL_STORAGE_QUERY_PROPERTY. At step 1120 the multi-path SCSI class driver gets the unique identifier for the component device object, i.e., by retrieving the value from the associated storage device filter object via a direct call interface, and the component device object is marked as being initialized (step 1122).

At step 1124 the multi-path SCSI class driver determines whether there is a master device object with the same unique ID. The multi-path SCSI class driver maintains a global list of all master device objects. The unique identifier is stored as part of the data associated with a master device object. The multi-path SCSI class driver searches the list of master device object for a matching identifier. If a match is not found, then the storage class device interface is enabled for the component device object (step 1126) and a master device object is created (step 1128). By contrast, if a match is found, then the component device object is added to the available paths list in the master device object (step 1132). At step 1134 the appropriate status is set to the NTSTATUS value returned by the Windows kernel API, and at step 1136 the routine terminates.

When a new master device object is created, the new master device is not added to the stack of the component device. Instead, a pointer to the top of the stack is obtained using the Windows kernel API IoGetAttachedDeviceReference (step 1130). The pointer may be used as an argument to the Windows® kernel API IoCallDriver, which allows the master device object to pass IRPs to the component device stack.

The master device object provides the device-specific functionality to the operating system. The master device object creates any required symbolic links to itself and enumerates any devices that might otherwise be handled by PnP requests. The symbolic links may be created using the Windows® kernel API call IoCreateSymbolicLink. The additional enumeration is device-specific. For example, partitions are enumerated on a disk by reading the partition table stored on the disk. For each partition found the driver creates a device object and creates the required symbolic links to them.

By way of example, a PnP request to remove a component device object may be handled as follows. If the component device path is not being used to send I/O requests to the device, then the component device object is removed from the list of available paths from the master device object and deleted from the device stack of the HBA. Removing the component device from the device stack of the HBA does not affect the persistent view of the master device object from the perspective of the operating system or the Plug-and-Play manager. By contrast, if the component device path is being used to send I/O requests to the device, then a new path is established using a component device object from the list of available paths maintained by the multi-path driver. A pointer to the new component device stack is obtained by the multi-path driver, e.g., by using the IoGetAttachedDeviceReference kernel API. The new component device stack becomes the target of new I/O requests. The pointer reference to the component stack being removed is released, e.g., by using the kernel API ObDereferenceObject. This allows the device stack to be removed without affecting the persistent view of the master device object from the perspective of the operating system or the Plug-and-Play manager.

Figure 12:
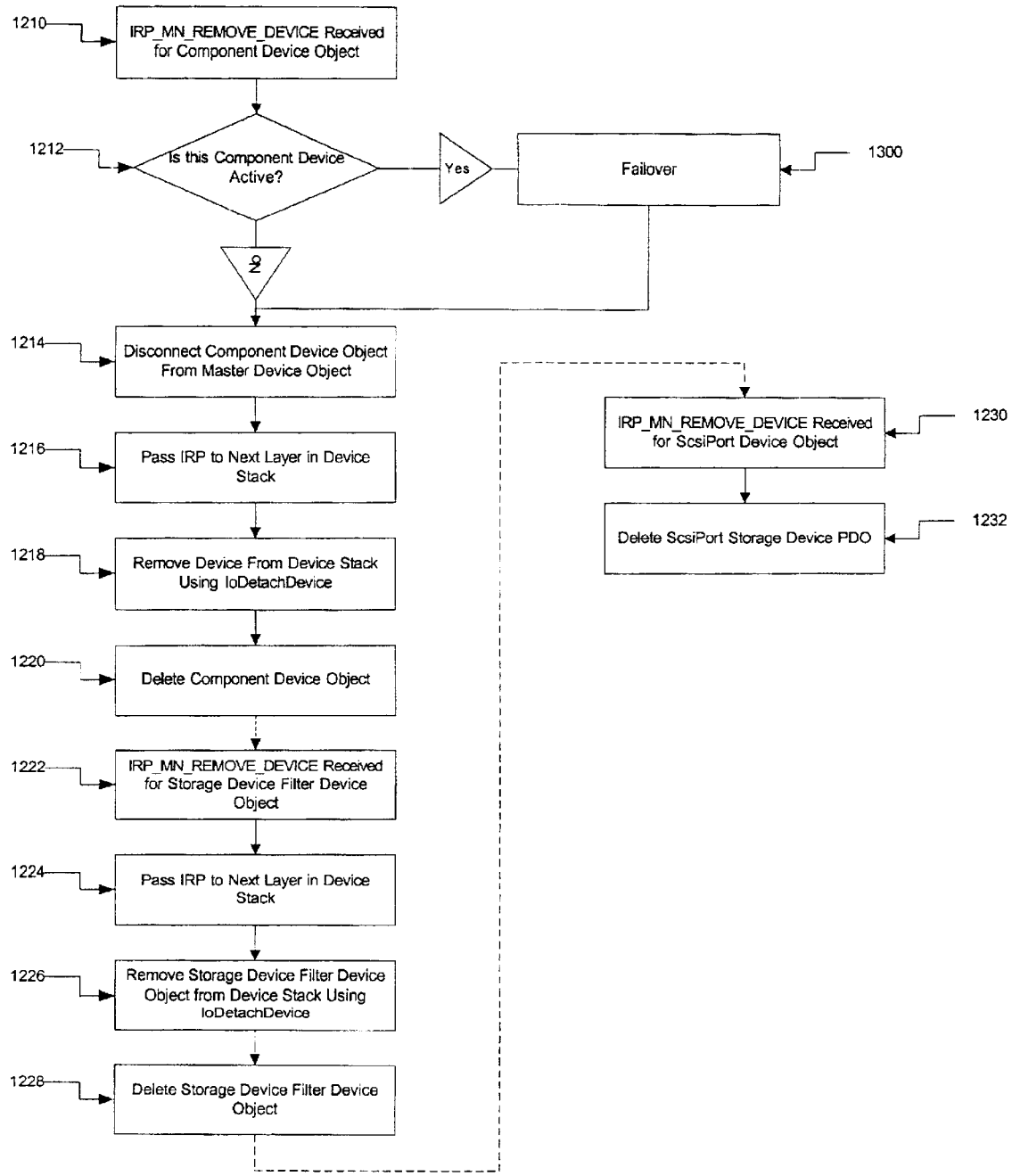
FIGS. 12–14 are flowcharts illustrating a method for removing a failed HBA.
Figure 13:
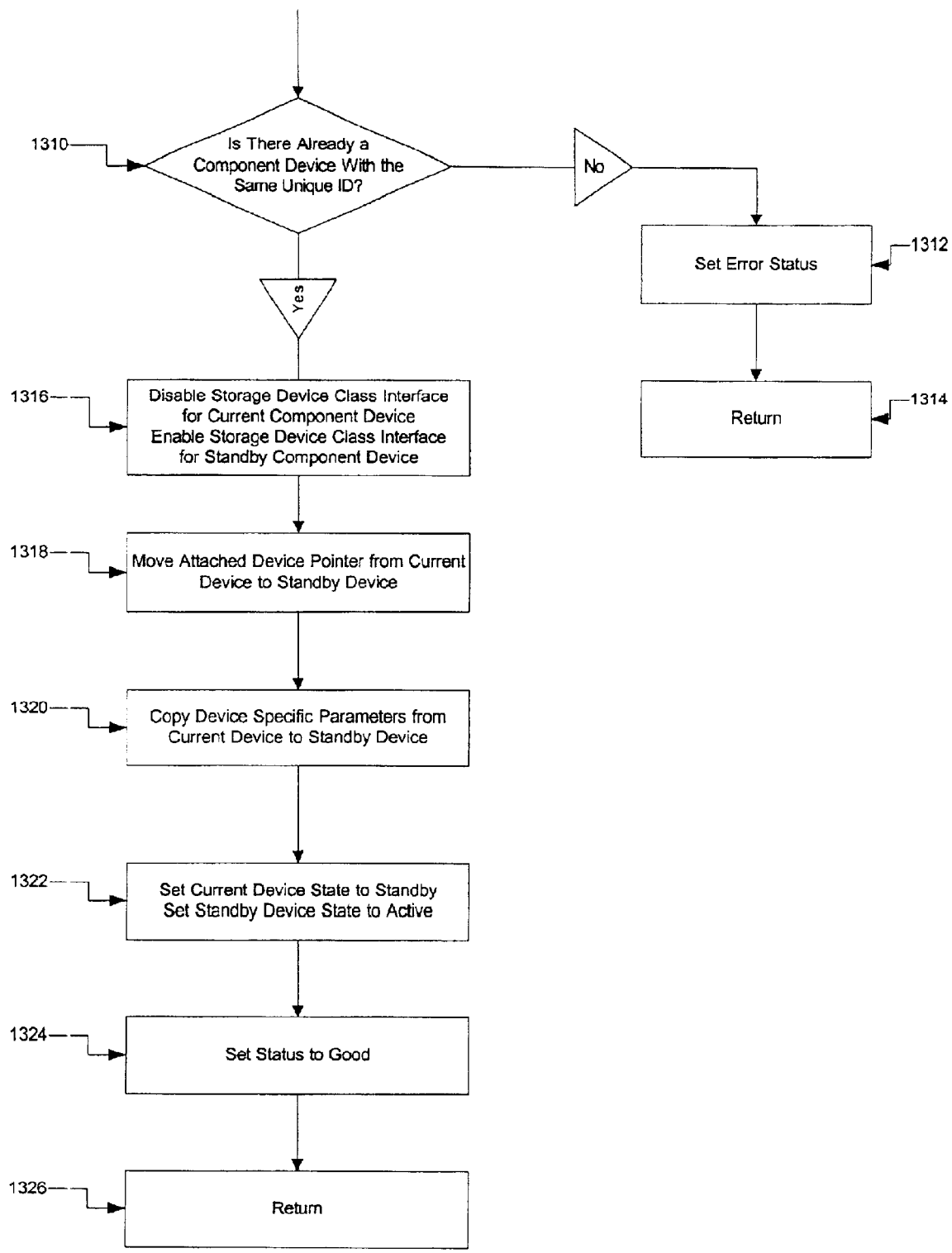
Figure 14:
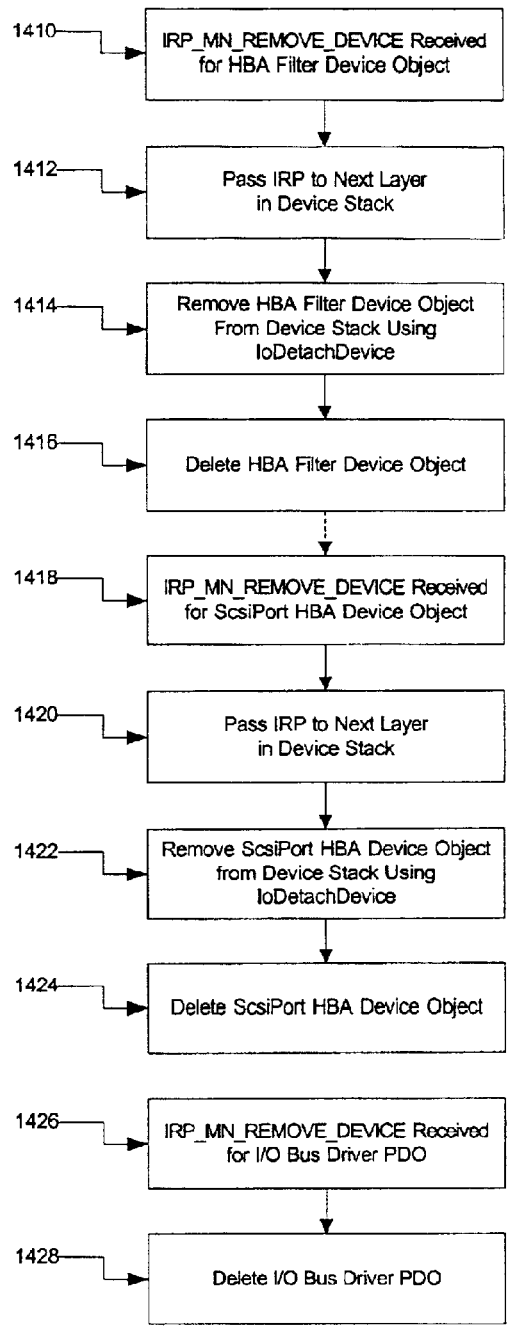

FIGS. 12–14 are flowcharts illustrating a method for removing a failed HBA. FIG. 12 shows the process of removing the device stack for a storage device attached to the failed HBA. This process is repeated for each device attached to the failed HBA. FIG. 14 illustrates the process of removing the device stack for the HBA.

At step 1210 an IRP_MN_REMOVE_DEVICE request is received for a component device object corresponding to a storage device. At step 1212 it is determined whether the component device is active. In an exemplary embodiment, the multi-path SCSI class driver makes this determination by examining the state attributes of the component device. An active component device will have a Current Device state set to True, while an inactive device will have a Current Device state set to False. If the component device is active, then a failover routine is implemented to change the status of the component device from active to inactive. An exemplary failover routine is described in FIG. 13.

If the component device is not active, then at step 1214 the component device object is disconnected from the master device object. At step 1216 the IRP is passed to the next layer in the device stack. At step 1218 the component device is removed from the device stack, e.g., by using the kernel API IoDetachDevice. At step 1220 the component device object is deleted.

At step 1222 the IRP_MN_REMOVE_DEVICE request is received for the storage device filter device object. At step 1224 the IRP is passed to the next layer in the device stack. At step 1226, the storage device filter device object is removed from the device stack, e.g., by using the kernel IoDetachDevice. At step 1228 the storage device filter device object is deleted.

At step 1230 the IRP_MN_REMOVE_DEVICE request is received for the SCSIPort PDO representing the storage device. At step 1232 the SCSIPort PDO is deleted. These steps are repeated for any remaining storage devices attached to the HBA. Once all storage device stacks have been removed, the PnP manager begins the process of removing the HBA device stack shown in FIG. 14.

At step 1410 an IRP_MN_REMOVE_DEVICE request is received for the HBA filter device object. At step 1412 the IRP is passed to the next layer in the device stack. At step 1414, the HBA filter device object is removed from the device stack, e.g., by using the kernel IoDetachDevice. At step 1416 the HBA filter device object is deleted.

At step 1418 the IRP_MN_REMOVE_DEVICE request is received for the SCSIPort HBA device object. At step 1420 the IRP is passed to the next layer in the device stack. At step 1422, the SCSIPort HBA device object is removed from the device stack, e.g., by using the kernel IoDetachDevice. At step 1424 the SCSIPort HBA device object is deleted.

At step 1426 the IRP_MN_REMOVE_DEVICE request is received for the I/O Bus Driver (for example, the PCI bus driver) PDO representing the HBA. At step 1428 the PDO is deleted.

FIG. 13 is a flowchart illustrating an exemplary failover routine. In an exemplary embodiment, the logic instructions for the failover routine may be executed by the multi-path SCSI class driver. At step 1310 it is determined whether there is another component device object with the same ID. This determination may be made by the multi-path SCSI class driver, i.e., by checking whether the list of available paths is empty. If there is not a component device with the same ID, then an error status is set (step 1312) and the routine ends (step 1314). By contrast, if there is a component device with the same ID, which indicates that an alternate path is available, then at step 1316 the storage device class interface for the current device is disabled, and the storage class device interface for the standby device is enabled. At step 1318 the Attached Device pointer is moved from the Current Device to the Standby Device. At step 1320, the device-specific parameters are copied from the Current Device to the Standby Device. At step 1322 the current device state is set to Standby, and the Standby Device state is set to Active. At step 1324 the status is set to Good. The status item describes the health of the active device after the return from the failover routine. If there is no standby device to failover to, then the currently active device is said to have an error status. If there is a standby device to failover to, then it becomes the new active device and it is said to have a good status.

The logic instructions executed in steps 1316 through 1324 provide the logical changes necessary to change the communication path from an active HBA to a backup HBA. The active HBA may then be removed, e.g., using the steps set forth in FIGS. 12 and 14, and replaced. After the HBA has been repaired (or replaced) the logic routines set forth in FIGS. 5–11 permit the HBA to be added, initialized, and started without shutting down the system. Accordingly, the present invention permits a failed HBA to be removed and repaired (or replaced) while the system remains active.

Although the above description refers to specific embodiments of the invention, the invention is not necessarily limited to the particular embodiments described herein. It is to be understood that various other adaptations and modifications may be made within the spirit and scope of the invention as set forth in the appended claims.

What is claimed is:

1. A method for enabling multi-path functionality between a host bus adapter in a host computer of a storage system and at least one storage device, wherein the host bus adapter provides a communication connection between at least one storage device and the host computer, the host computer having a processor and associated memory, and an operating system including a PnP manager that maintains a logical device stack for the storage device, comprising the steps of:

intercepting responses from one or more of the storage devices to PnP requests initiated from the PnP manager seeking the identity of the storage device;

modifying the PnP responses to cause a multi-path SCSI class device driver to be loaded;

attaching a component device object to the device stack of the storage device;

obtaining an identifier for the component device object;

determining whether a master device object having an identifier corresponding to the identifier for the component device object exists, and if so, then creating an association for the component device object as an available path for the master device object; and if a master device object having an identifier corresponding to the identifier for the component device object does not exist, then creating a master device object and linking the master device object to the device stack of the storage device by obtaining a pointer to the component device object.

2. A method according to claim 1, wherein the step of intercepting responses from one or more of the storage devices to PnP requests initiated from the PnP manager seeking the identity of the storage device includes intercepting responses to PnP requests having a minor function code of IRP_MN_QUERY_ID and a query type of BusQueryDeviceID, BusQueryCompatibleIDs, or BusQueryHardwareIDs.

3. A method according to claim 1, wherein the step of modifying the PnP responses to cause a multi-path SCSI class device driver to be loaded comprises replacing the PnP enumerator type in the response with a predetermined PnP enumerator type.

4. A method according to claim 1, wherein the step of determining whether a master device object having an identifier corresponding to the identifier for the component device object exists includes searching a list of master devices stored in the memory associated with the processor.

5. A method according to claim 2, further comprising the step of replacing hardware string identifier information with a predetermined hardware string identifier for responses having a query type of BusQueryHardwareIDs.

6. A system for enabling multi-path functionality between a host bus adapter in a host computer of a storage system and at least one storage device, wherein the host bus adapter provides a communication connection between at least one storage device and the host computer, the host computer having a processor and associated memory, and an operating system including a PnP manager that maintains a logical device stack for the storage device, comprising:

means for intercepting responses from one or more of the storage devices to PnP requests initiated from the PnP manager seeking the identity of the storage device;

means for modifying the PnP responses to cause a multi-path SCSI class device driver to be loaded;

means for attaching a component device object to the device stack of the storage device;

means for obtaining an identifier for the component device object;

means for determining whether a master device object having an identifier corresponding to the identifier for the component device object exists, and if so, then creating an association for the component device object as an available path for the master device object; or if a master device object having an identifier corresponding to the identifier for the component device object does not exist, then creating a master device object and linking the master device object to the device stack of the storage device by obtaining a pointer to the component device object.

7. A system according to claim 6, wherein the means for means for intercepting responses from one or more of the storage devices to PnP requests initiated from the PnP manager seeking the identity of the storage device comprises a host bus adapter HBA-specific filter driver.

8. A system according to claim 6, wherein the multi-path SCSI class device driver creates a component device object for the storage device and attaches the component device object to the device stack for the storage device.

9. A system according to claim 7, wherein the HBA-specific filter driver intercepts responses to PnP requests having a minor function code of IRP_MN_QUERY_ID and a query type of BusQueryDeviceID, BusQueryCompatibleIDs, or BusQueryHardwareIDs and replaces the enumerator type in the response with a predetermined enumerator type.

* * * * *